United States Patent Office 3,537,724
Patented Nov. 3, 1970

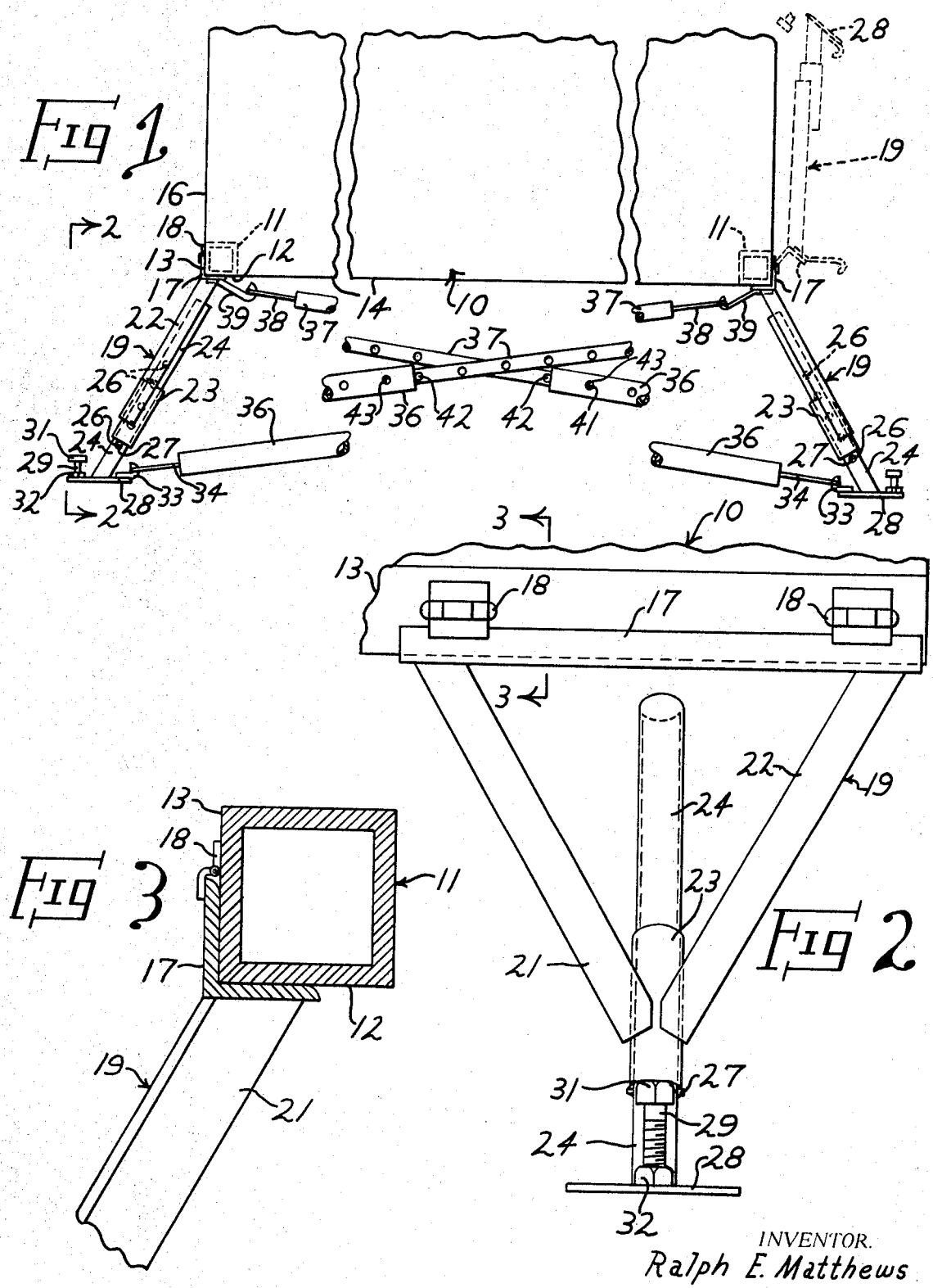

3,537,724
TRAILER SUPPORT
Ralph E. Matthews, Box 156, Rte. 3,
Decatur, Ala. 35601
Filed Aug. 6, 1968, Ser. No. 750,626
Int. Cl. B60s 9/04
U.S. Cl. 280—150.5        2 Claims

ABSTRACT OF THE DISCLOSURE

A trailer support having elongated members extending alongside and engaging the outer sides and under surface of trailer frame members. The elongated members are hingedly connected to trailer frame and carry downwardly and outwardly extending adjustable legs detachably connected at their lower ends to elongated members at opposite side of trailer.

BACKGROUND OF THE INVENTION

This invention relates to a trailer support and more particularly to a support for a trailer having longitudinal extending frame supports at each side thereof connecting the bottom of the trailer to the sides thereof.

Heretofore in the art to which my invention relates, difficulties have been encountered in supporting trailers, such as house trailers in a manner to prevent lateral shifting of the trailer on its support. Accordingly, it has been the usual practice to build a temporary or permanent foundation beneath the trailer for supporting the same where the trailer is not supported by its wheels. Where vertical supports are employed beneath the trailer, the lateral forces against the trailer, such as strong winds, cause the trailer to be shifted or blown off its support.

BRIEF SUMMARY OF INVENTION

To overcome the above and other difficulties, I provide a trailer support which embodies elongated members extending alongside and engaging longitudinally extending frame members carried by the trailer. The elongated member is hingedly connected along its upper edge to the trailer frame member and carries downwardly and outwardly extending leg members which are movable with the elongated members from a downwardly and outwardly extending position to an upward, non-supporting, position alongside the sides or undersides of the trailer. The lower end of each leg member is detachably connected to the elongated members at the opposite side of the trailer by adjustable members to restrain outward movement of the leg members relative to each other and the trailer.

A trailer support embodying features of my invention is illustrated in the accompanying drawing, forming a part of this application, in which:

FIG. 1 is an end, elevational view, partly broken away, showing one support member in elevated position in dotted lines;

FIG. 2 is an enlarged, fragmental view looking at the side of one of the support members and taken generally along the line 2—2 of FIG. 1; and FIG. 3 is an enlarged view taken generally along the line 3—3 of FIG. 2.

Referring now to the drawing for a better understanding of my invention, I show a trailer 10 having elongated, longitudinally extending frame members 11 at each side thereof. The frame members 11 are strong structural members, which may be in the form of box-like structural members, which are generally rectangular, as viewed in cross section, as shown in FIG. 3. Also, the elongated, longitudinally extending members 11 may be in the form of channels or other structural members. Each of the longitudinally extending members 11 is provided with an under surface 12 and an outer surface 13 which are joined to each other at the point the bottom 14 of the trailer is connected to the sides thereof indicated at 16.

Extending alongside and engaging the outer side 13 and under surface 12 of each of the longitudinally extending frame members 11 at spaced intervals from each other are elongated angle-like members 17. The upper edge of each elongated member 17 is hingedly connected by suitable hinges 18 to the side 13 of the longitudinally extending member 11, as shown in FIGS. 2 and 3, whereby the elongated member 17 is adapted to move from the solid line position shown in FIG. 1 to the dotted line position. Secured to and extending downwardly and outwardly from each elongated member 17 is the upper end of a leg member indicated generally at 19. Each leg member 19 comprises a pair of converging members 21 and 22, which may be in the form of angles, as shown in FIG. 3. Mounted between and secured rigidly to the lower ends of the converging members 21 and 22 is a sleeve member 23 which receives with a sliding fit an elongated tubular member 24. A plurality of longitudinally spaced openings 26 are provided through each of the tubular members 24 for receiving a transverse pin 27 which is adapted to engage the lower end of the sleeve 23 to limit downward movement of the sleeve relative to tubular member 24. Accordingly, the effective length of each leg member 19 may be varied by moving the sleeve relative to the tubular member 24 and then inserting the transverse pin 27 through the desired opening 26.

A horizontal foot member 28 is secured rigidly to the lower end of each of the tubular members 24 in position to engage a supporting surface. A threaded opening is provided through the outer portion of the foot member 28 for receiving an externally threaded bolt-like member 29 having a head 31. Preferably, a lock nut 32 is mounted on the bolt-like member 29 adjacent the upper surface of the foot member 28 to lock the bolt 29 in selected positions whereby final adjustment of the overall length of each leg member 19 may be made to thus level the trailer 10.

As shown in FIG. 1, each foot member 28 is provided with a hook-like member 33 adjacent the inner side thereof for receiving an elongated member 34 which is connected to one end of a tubular member 36. The other end of each tubular member 36 telescopically receives a tubular member 37 which is connected by an elongated member 38 to a hook member 39 carried by the elongated member 17. A plurality of longitudinally spaced openings 41 and 42 are provided through the tubular members 36 and 37, respectively, which are adapted to move into alignment with each other and receive a transverse pin 43 whereby the overall length of the tubular members 36 and 37 may be varied to connect the lower end of each of the leg members at one side of the trailer to an elongated member 17 at the opposite side of the trailer and thus restrain outward movement of the leg members 19 relative to each other and the trailer 10. Accordingly, the leg members 19 assume the position shown in FIG. 1 to thus support the trailer by the engagement of the elongated angle members 17 with the adjacent surfaces 12 and 13 of the longitudinally extending members 11.

From the foregoing description, the operation of my improved trailer support will be readily understood. While the trailer is being transported the leg members 19 at opposite sides of the trailer 10 are moved to the dotted line position shown in FIG. 1 and are retained in this position while the trailer is being transported. Also, by mounting the hinge 18 on the lower edge of the elongated member 17 the leg members 19 may be moved to a non-supporting position adjacent the underside of the trailer. While I have shown only one leg member 19 as being moved to the dotted line position, it will be apparent that the leg members at both sides of the trailer 10 are movable to the dotted line position.

To support the trailer 10 from a supporting structure, the leg members 19 are moved downwardly to the position shown in FIG. 1, whereby they extend downwardly and outwardly relative to the trailer 10 with the inner surface of the elongated angle members 17 engaging with a firm fit the adjacent surfaces 12 and 13 of the longitudinally extending members 11. The length of each leg member 19 is adjustable to accommodate variations in the supporting surface by inserting the transverse pin 27 in the proper opening 26 in the tubular member 24. The diagonal brace member comprising the tubular members 36 and 37 are attached to the hook members 33 and 39 and the transverse pins 43 are inserted through aligned openings 41 and 42 to thus secure the tubular member 36 to the tubular members 37, as shown in FIG. 1. Final adjustments are made in the leveling of the trailer by turning the bolt members 29 in the proper direction to elevate the outer end of the foot member 28 to the proper elevation.

From the foregoing, it will be seen that I have devised an improved support for a trailer, such as a house trailer. By providing downwardly and outwardly extending leg members which engage the outer and under surface of an elongated member extending longitudinally of the sides of the trailer, the trailer is supported in a manner to prevent lateral shifting of the trailer on its support. Also, by providing means for varying the overall length of each supporting leg, together with means for making final adjustments of the length of each leg, the trailer is leveled accurately regardless of the contour of the surface on which the trailer is supported. Also, by providing detachable brace members which are adjustable in length, the lower ends of the leg members 19 are secured to the elongated members carried by the upper ends of the legs at the opposite side of the trailer to thus limit outward movement of the lower ends of the legs relative to each other. Furthermore, by providing a hinge connection between the elongated angle member 17 and the longitudinally extending member 11 the leg members 19 may be readily moved to the non-supporting position, shown in dotted lines in FIG. 1, whereby the trailer may be moved from place to place in an efficient manner.

While I have shown my invention in but one form, it will be obvious to those skilled in the art that it is not so limited, but is susceptible of various other changes and modifications without departing from the spirit thereof.

What I claim is:

1. In a support for a trailer having longitudinally extending frame members at each side thereof connecting the bottom of the trailer to the sides thereof:

(a) an elongated member extending alongside and engaging the outer side and under surface of each of said longitudinally extending frame members, (b) means hingedly connecting an edge of each said elongated member to the frame member adjacent thereto, (c) a downwardly and outwardly extending leg member connected at its upper end to each said elongated member and movable with said elongated member from a downwardly and outwardly extending supporting position to an upward non-supporting position alongside the trailer, wherein said leg members each comprise an upper section secured at its upper end to said elongated member, a movable section mounted for movement to selected elevations along said upper section to vary the effective length of the leg member, and means detachably connecting said movable section to said upper section at selected elevations, (d) a detachable means connecting the lower end of each said leg member at one side of the trailer to a said elongated member at the opposite side of the trailer to restrain outward movement of the leg members, (e) a relatively flat foot member carried by the lower end of said movable section, and (f) a vertically adjustable extension member carried by an outer portion of said foot member in position to engage a subjacent supporting surface and move said foot member upwardly to vary the elevation at which said leg member carried thereby is supported.

2. A support for a trailer as defined in claim 1 in which said extension member comprises an elongated externally threaded member in threaded engagement with an internally threaded portion of said foot member, and means to rotate said elongated threaded member.

References Cited

UNITED STATES PATENTS

| 2,388,308 | 11/1945 | Court | 280—150.5 |
| 2,519,364 | 8/1950 | Fredholm | 254—86 |
| 3,096,065 | 7/1963 | Horne | 248—354 |
| 3,125,352 | 3/1964 | Gouin | 280—154.5 |
| 3,367,614 | 2/1968 | Leonard | 248—354 |
| 3,454,251 | 7/1969 | Dye | 248—354 |

FOREIGN PATENTS 838,955   6/1960   Great Britain.

BENJAMIN HERSH, Primary Examiner

L. J. PAPERNER, Assistant Examiner

U.S. Cl. X.R.

248—354